J. B. CORNWALL.
MACHINE FOR FINISHING, CLEANING, AND POLISHING RICE.
APPLICATION FILED AUG. 26, 1914.
1,132,447.
Patented Mar. 16, 1915.
3 SHEETS—SHEET 1.
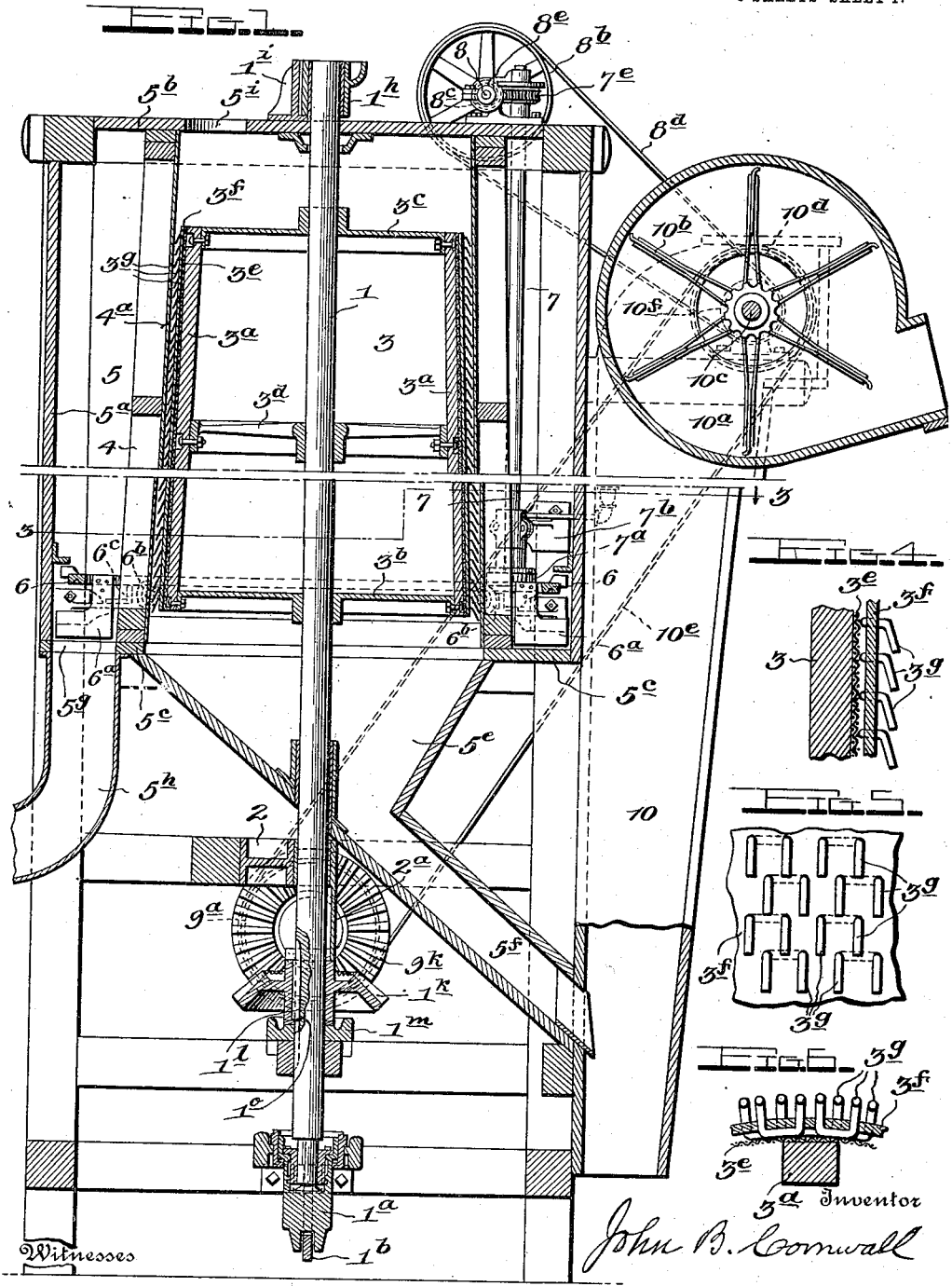

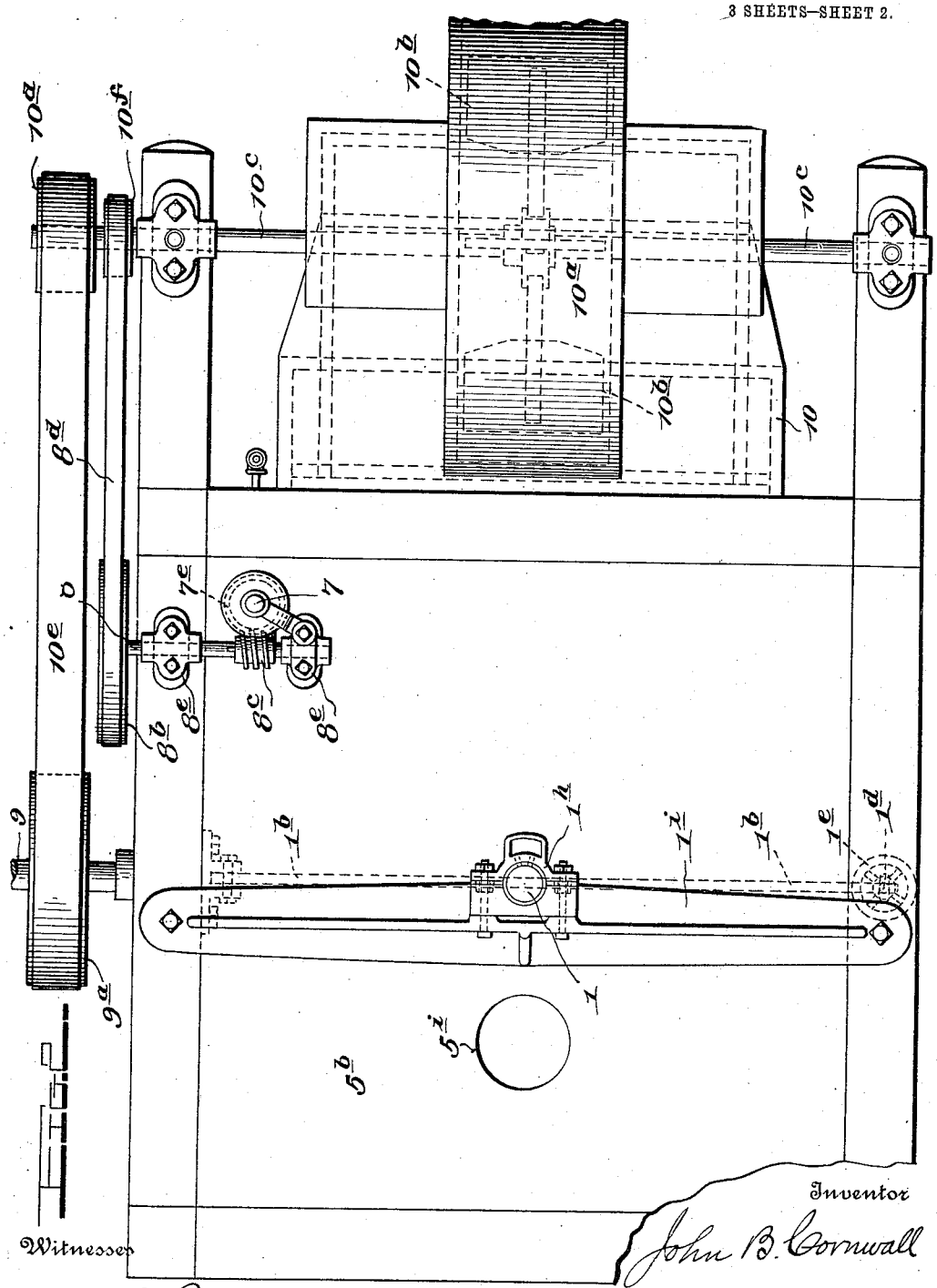

J. B. CORNWALL.
MACHINE FOR FINISHING, CLEANING, AND POLISHING RICE.
APPLICATION FILED AUG. 26, 1914.
1,132,447.
Patented Mar. 16, 1915.
3 SHEETS—SHEET 3.
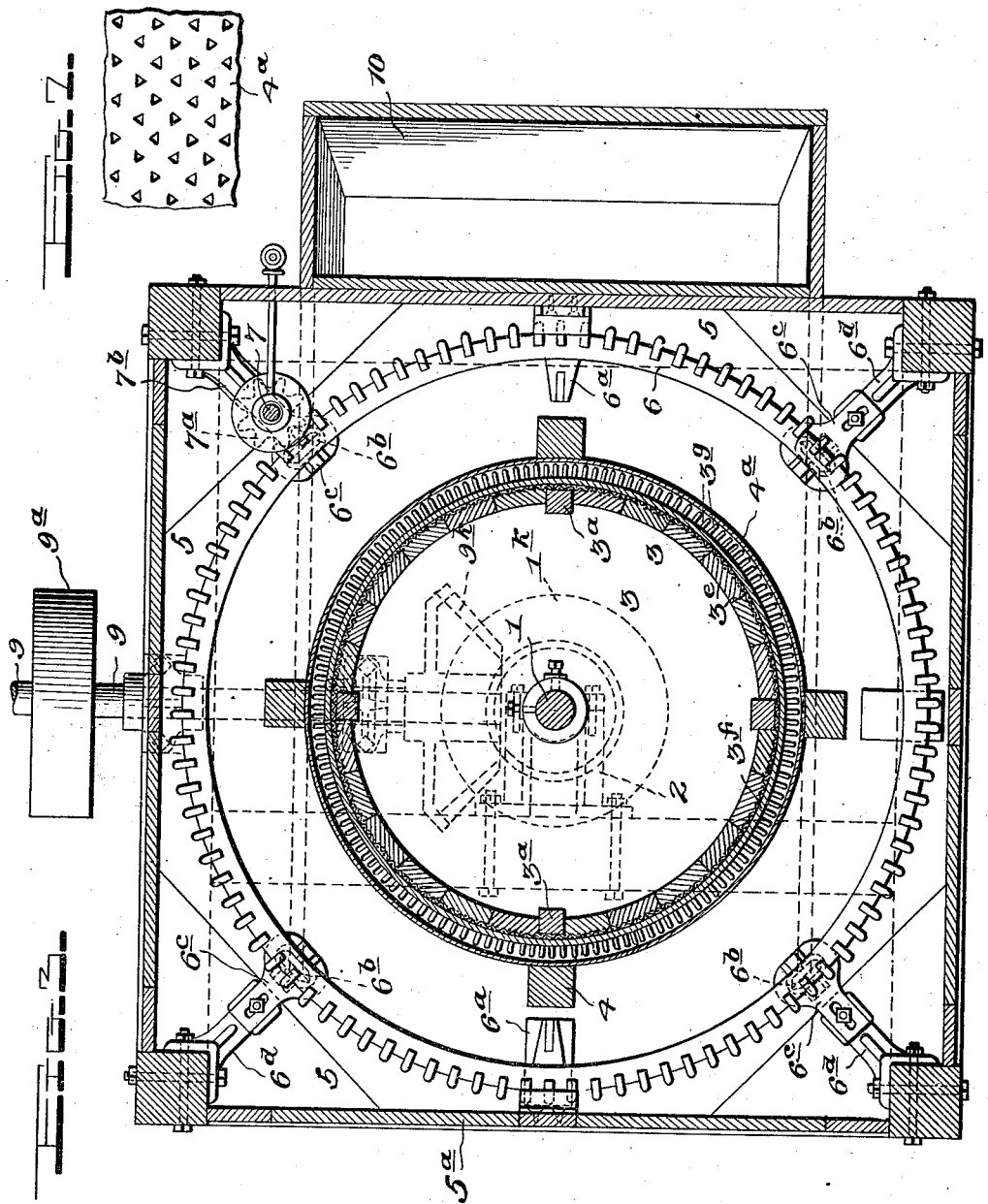

UNITED STATES PATENT OFFICE.

JOHN B. CORNWALL, OF MOLINE, ILLINOIS, ASSIGNOR TO BARNARD AND LEAS MANUFACTURING COMPANY, OF MOLINE, ILLINOIS, A CORPORATION OF ILLINOIS.

MACHINE FOR FINISHING, CLEANING, AND POLISHING RICE.

1,132,447.        Specification of Letters Patent.     Patented Mar. 16, 1915.

Application filed August 26, 1914. Serial No. 858,756.

*To all whom it may concern:*

Be it known that I, JOHN B. CORNWALL, a citizen of the United States, residing at Moline, in the county of Rock Island and State of Illinois, have invented certain new and useful Improvements in Machines for Finishing, Cleaning, and Polishing Rice; and I hereby declare that the following is a full, clear, and exact description thereof, reference being had to the accompanying drawings, which form part of this specification.

This invention is an improved machine for finishing, cleaning and polishing rice. In this machine I provide novel means for scouring the rice and for removing the dust and chaff therefrom by passing the scoured rice through an air separator: I also provide novel means for discharging the dust from the settling chamber; also novel means for preventing the scouring elements from pressing back or embedding themselves in the wooden scouring cylinder, and thus altering the space between the scouring surfaces.

Other novel features of the invention will be hereinafter set forth, and the construction and operation of the machine will be fully understood from the following description and the accompanying drawings, in which:

Figure 1 is a vertical section through the complete machine partly broken away. Fig. 2 is a top plan view of the machine partly in section. Fig. 3 is a sectional view on the line 3—3, Fig. 1. Figs. 4, 5 and 6 are enlarged detail views of the covering of the scouring cylinder. Fig. 7 is a detail of the scouring case.

The machine preferably comprises a main frame in which is mounted a vertical conically tapered beater or scouring cylinder; and surrounding this cylinder is a conically tapered scouring case; and surrounding this scouring case is a settling chamber; and the scoured material is discharged into a hopper from which it is conducted into the lower end of an air trunk that communicates at top with a fan. The rice or material to be scoured is fed between the scouring cylinder and case, and the scoured material is conducted into the lower end of the air trunk, and the clean grain is discharged from the lower end of the air trunk, while the dust and chaff are discharged into and through the fan chamber.

The main shaft 1 is vertical, and supported in a step-bearing $1^a$ mounted upon a lighter bar $1^b$, pivotally connected to the main frame at one end and at its other end connected to a screw rod $1^d$ which extends through a suitable support on the main frame and may be vertically adjusted by means of a hand nut $1^e$, so as to raise or lower the shaft 1 in the usual manner. The upper end of the shaft 1 is journaled in a bearing $1^h$ attached to a cross bar $1^i$ supported upon the top members of the frame. The shaft 1 is driven by means of a gear $1^k$ which is suported upon a bearing $1^m$ mounted on a cross bar on the main frame above the step-bearing. To permit the shaft 1 to be adjusted vertically, it is longitudinally grooved, as at $1^o$. This groove is engaged by a longitudinal key $1^l$ in the gear $1^k$. By thus putting the spline in the gear instead of in the shaft, the shaft can be adjusted vertically without moving or shifting the gear $1^k$. Above the gear $1^k$ is a bridge-tree 2, which is fixedly supported upon the main frame, and has a depending portion $2^a$ that engages the top of the gear $1^k$ and will prevent the gear from rising when the shaft is vertically adjusted. This bridge piece also prevents lateral vibration of the shaft.

Secured upon the upper portion of the shaft 1 is the scouring cylinder 3, which is conically tapered, being smallest at its upper end. This cylinder is preferably made up of wooden staves or sections $3^a$, attached to metal heads or spiders $3^b$ and $3^c$, and an intermediate spider $3^d$. The exterior surface of this cylinder is preferably covered with wire cloth $3^e$, exterior to which is the usual scouring carding or cloth. This card preferably consists of a leather cover or backing $3^f$ to which are bent numerous bent wire fingers $3^g$. The wire cloth $3^e$ prevents the card fingers $3^g$ from pressing back into the wood, and at the same time permits the use of tacks or nails to fasten the carding cloth $3^f$ upon the cylinder.

Surrounding the scouring cylinder and in close proximity thereto is the scouring case 4 which is stationary and is preferably composed of wooden sections or slats and covered internally with a metallic facing which may be of woven or perforated or reticulated metal. Preferably I use a perforated metal covering 4ª (see Fig. 7) having a roughened interior surface, or burs on its inner surface, and this metal lining coacts with the scouring cloth or fingers 3ᵍ to scour the rice. This roughened surface retards the descent of the rice through the scouring chamber while the said scouring fingers 3ᵍ operate thereupon. I have found wire cloth woven from wire approximately square or angular in cross section very effective as the corners or angles of such wire form a rough surface substantially like the burs or openings in the perforated metal would form. This scouring case may be made in sections united together in the usual manner.

The scouring case is inclosed within a settling chamber 5 that is formed between the side walls 5ª of the main frame and the outer wall of the scouring case 4. The top of this chamber may be closed by a ceiling 5ᵇ, and at its bottom by a floor 5ᶜ, of ordinary construction. In the bottom of this settling chamber and surrounding the shaft 2 is an opening communicating with a hopper 5ᵉ having a discharge chute 5ᶠ by which the scoured material is directed into the lower end of an air trunk 10 hereinafter referred to.

The dust which passes through the scouring case into the chamber 5 descends therein and may be discharged therefrom through an opening 5ᵍ which may be located at any desired point of the case and connected with a spout 5ʰ of any suitable kind, by which it may be directed to any desired point of discharge.

The dust is discharged from chamber 5 by means of traveling scrapers 6ª which are attached to an annulus 6 which is grooved on its under side and supported upon rollers 6ᵇ mounted on supports 6ᶜ attached to brackets 6ᵈ secured to the corner posts of the frame. The annulus 6 is externally toothed as shown, and meshes with a pinion 7ª on the lower end of a shaft 7 journaled in brackets 7ᵇ secured to one of the corner posts of the machine, and this shaft 7 extends through the top of the machine and is provided with a worm 7ᵉ on its upper end which meshes with a worm 8ᵉ on a shaft 8 journaled in suitable bearings 8ᵉ on top of the machine, and which is driven by a pulley 8ᵇ and (belt 8ᵈ) from a pulley 10ᶠ on the fan shaft 10ᶜ hereinafter referred to.

The main shaft 1 may be driven by means of bevel gear 9ᵏ mounted on a shaft 9 journaled in suitable brackets on the main frame, and meshing with a gear 1ᵏ. Said shaft 9 may be driven by any suitable means.

A vertical air trunk 10 is arranged at one side of the machine as shown, and may be of ordinary construction; being open at its lower end and communicating at its upper end with a fan casing 10ª in which is a fan 10ᵇ mounted on a shaft 10ᶜ which may be provided with a pulley 10ᵈ, driven by a belt 10ᵉ (indicated in dotted lines) from a pulley 9ª on the shaft 9. And on shaft 10ᶜ is a pulley 10ᶠ which operates belt 8ᵈ by which the worm 8 is actuated.

The rice or material to be operated upon can be fed into the upper end of the scouring chamber through a suitable opening, as 5ⁱ, in the top 5ᵇ, which opening may be located at any desired point not covered by the bridge tree. Grain may be supplied to this opening by the usual feeding devices, not shown.

Operation: In operation the grain is fed into the scouring chamber and is scoured in its descent therethrough between the opposed walls of the scouring cylinder and scouring casing. The descent of the grain is retarded by the roughened interior surface of the scouring case, and is thoroughly cleansed by the fingers on the cylinder rubbing the grain against the roughened surface of the scouring case. The cleaned grain descends into hopper 5ᵉ and passes thence through spout 5ᶠ into the air trunk 10, a short distance above the lower end thereof, where it is subjected to the action of the ascending air currents, and the dust and chaff are separated from the grain by the air and discharged through the fan casing into any suitable receiver. The dust and scourings which may pass through the scouring case into the settling chamber 5 is retained therein and deposited by gravity on the floor thereof, whence it is removed by the scraper blades 6ª and discharged through the opening 5ᵍ and pipe 5ⁿ.

This machine is peculiarly successful in the scouring of rice, for which it was particularly designed, and scours the rice thoroughly and separates the dust and chaff therefrom. The degree of scouring can be regulated by adjusting the scouring cylinder vertically, and this may be effected without disturbing the gearing for driving the cylinder.

What I claim is:

1. In a machine for cleaning and scouring rice, a scouring cylinder having its exterior surface covered with scouring cloth, and a reticulated metallic lining interposed between the scouring cloth and the surface of the cylinder to protect the latter, substantially as described.

2. In a machine for cleaning and scouring rice, a scouring cylinder having wooden walls and having the exterior surface thereof covered with scouring cloth, and a metallic lining interposed between the scouring cloth and the wooden walls of the cylinder to protect the latter.

3. In a machine for cleaning and scouring rice, a scouring cylinder having its exterior surface covered with scouring cloth, and a reticulated metallic lining interposed between the scouring cloth and the surface of the cylinder to protect the latter; with a scouring case having its inner surface covered with perforated metal to retard the descent of the grain.

4. In a machine for cleaning rice and the like, a scouring casing having its inner wall formed of perforated metal, and a scouring cylinder within the case having a metallic covering and exterior scouring fingers.

5. In a machine for cleaning rice and the like, the combination of a conical scouring casing having an inner surface formed of perforated metal, and a conical scouring cylinder within the case having its surface provided with a metallic covering and exterior bent scouring fingers.

6. In a machine for cleaning and scouring rice, a scouring cylinder formed of wood and having its exterior surface covered with scouring cloth, and a metallic lining interposed between the scouring cloth or fingers and the surface of the cylinder to protect the latter; a scouring case having its inner surface covered with perforated metal to retard the descent of the grain, a casing forming a settling chamber surrounding the scouring cylinder, means for removing dust from said chamber, and means for vertically adjusting the scouring cylinder.

7. In combination, a scouring member having an exterior scouring cloth, and a reticulated metallic lining interposed between the scouring cloth and the surface of the member to protect the latter, substantially as described.

8. In combination, a scouring cylinder having wooden walls, a scouring cloth covering the exterior surface thereof, and a metallic lining interposed between the scouring cloth and the wooden walls of the cylinder to protect the latter.

In testimony that I claim the foregoing as my own, I affix my signature in presence of two witnesses.

JOHN B. CORNWALL.

Witnesses:
H. P. WILSON,
EDW. F. JONES.

Copies of this patent may be obtained for five cents each, by addressing the "Commissioner of Patents, Washington, D. C."